United States Patent [19]
House et al.

[11] Patent Number: 5,469,472
[45] Date of Patent: Nov. 21, 1995

[54] MESSAGE SUBSTITUTION IN A DIGITAL COMMUNICATION SYSTEM

[76] Inventors: Robert W. House, 351 Whitehall Ave., Northlake, Ill. 60164; Paul M. Bocci, 23W732 W. Pine Ave., Roselle, Ill. 60172; James G. Edkins, 510 Shallow Cove, Lake Zurich, Ill. 60047

[21] Appl. No.: 306,334

[22] Filed: Sep. 15, 1994

Related U.S. Application Data

[63] Continuation-in-part of Ser. No. 144,073, Oct. 29, 1993, abandoned.

[51] Int. Cl.$^6$ .................................................. H04L 25/52
[52] U.S. Cl. .................. 375/211; 370/85.6; 455/34.2; 455/58.1; 340/825.51; 375/368
[58] Field of Search .................................. 375/211, 214, 375/368; 370/85.6, 95.1, 95.3, 97; 455/18, 34.2, 58.1, 58.2; 340/825.5, 825.51; 379/59–60, 62–63

[56] References Cited

U.S. PATENT DOCUMENTS

| | | | |
|---|---|---|---|
| 4,788,543 | 11/1988 | Rubin | 455/58.1 |
| 4,790,013 | 12/1988 | Kage | 375/365 |
| 5,109,393 | 4/1992 | Saegusa | 375/357 |
| 5,249,304 | 9/1993 | Mulford | 455/58.2 |

*Primary Examiner*—Young Tse

[57] ABSTRACT

In a digital communication system (100), a second message (309) may be substituted for a first message (301) by detecting a suitable transition point and beginning transmission of the second message at this transition point. In a frame-synchronous digital communication system, this transition point is a frame boundary within the first message.

12 Claims, 3 Drawing Sheets

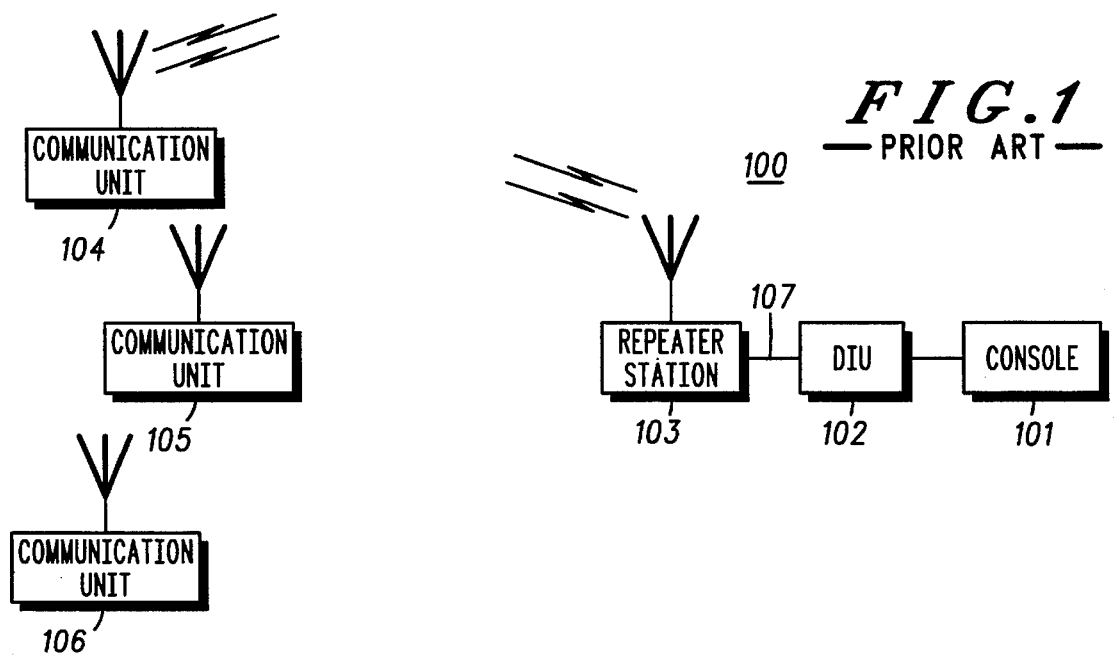
FIG.1 —PRIOR ART—
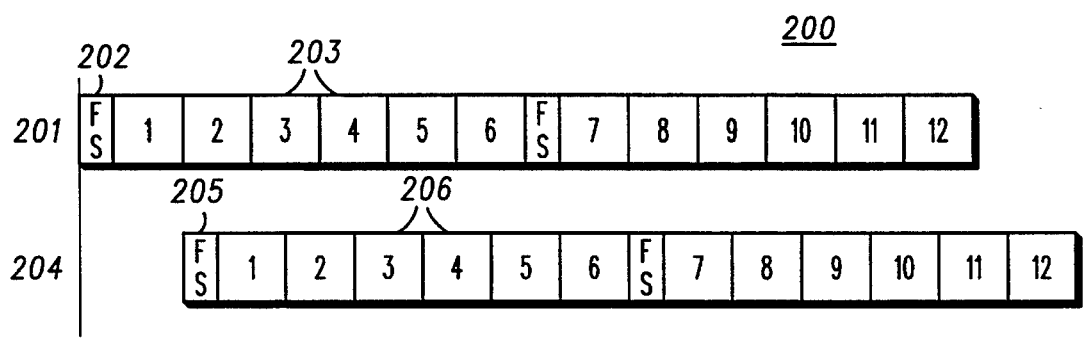
FIG.2
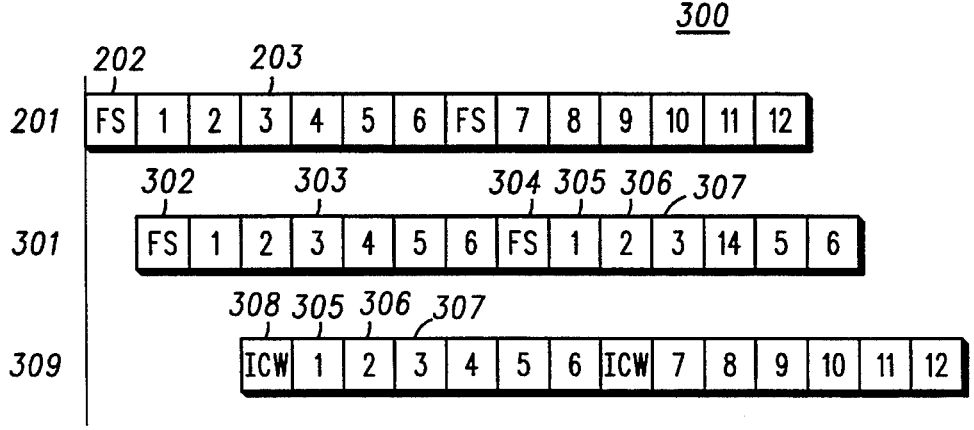
FIG.3

MESSAGE SUBSTITUTION IN A DIGITAL COMMUNICATION SYSTEM

CROSS-REFERENCE TO RELATED APPLICATION

This is a continuation-in-part of prior application Ser. No. 08/144,073, filed Oct. 29, 1993, by Robert W. House et al., now abandoned, the same inventors as in the present application, which prior application is assigned to Motorola, Inc., the same assignee as in the present application, and which prior application is hereby incorporated by reference verbatim, with the same effect as though the prior application were fully and completely set forth herein.

FIELD OF THE INVENTION

This invention relates generally to digital communication and in particular to frame-synchronous digital message transmission, and is more particularly directed toward substitution of messages in a frame-synchronous digital communication system.

BACKGROUND OF THE INVENTION

Two-way radio communication systems supporting dispatch applications provide both radio-to-radio and dispatcher-to-radio communication capabilities. Since the priority of communications in such an application is frequently associated with the source of a message, these radio systems provide a mechanism to allow certain messages to have priority access to the communications systems, even preempting currently active messages to provide it.

FIG. 1 illustrates, in block diagram form, a communications system, generally depicted by the numeral 100. A control console 101, including one or more operator positions, is shown coupled to a digital interface unit or DIU 102 and then coupled to a repeater station 103 via a point-to-point interface 107. The point-to-point interface 107 may be telephone lines, dedicated hard-wired lines, a microwave link, etc. The console 101 may also be connected to other repeater stations via DIUs, base stations, and satellite receivers as well-known in the art. The communication system as shown supports communications among a number of mobile or portable communication units 104, 105 and 106.

In normal operation, signals from a communication unit 104 are transmitted to the repeater station 103. The repeater station 103 then sends the received signals to the console 101 by way of the DIU 102. It also retransmits the received signal to the other communication units 105 and 106. If, during this operation, it is necessary for the console operator to communicate with the mobile units with a higher priority message, the console operator will initiate a transmission from the console 101. The DIU 102 then converts the console message from its analog form to a digital form, compatible with the communication system. When the console message reaches the repeater station 103, the station must switch from retransmitting the received signal to transmitting the console signal.

The current state of the art, for analog communications systems, performs the above switching function with timing that is unrelated to the content of the two messages. The repeated message is terminated and the console message substituted as rapidly as the repeater station is able to make the change.

State of the art digital communication systems present difficulties when attempting to use these old techniques. The frame-synchronous nature of most advanced digital voice signaling formats results in significant disruption to system operation if switching is performed in an uncoordinated manner. Among other reasons, this disruption can be attributed to the necessity for reacquiring system timing and synchronization information for the new message. Accordingly, a technique to accomplish the switching functions in an expeditious manner for digital communication systems is needed.

SUMMARY OF THE INVENTION

This need and others are met by the method of the present invention, substantially as described by claim 1, below.

BRIEF DESCRIPTION OF THE DRAWINGS

FIG. 1 illustrates, in block diagram form, a communication system.

FIG. 2 illustrates signal flows into and out of a repeater station in normal operation.

FIG. 3 illustrates signal flows into and out of a repeater station performing a priority signal change in accordance with the present invention.

DESCRIPTION OF THE PREFERRED EMBODIMENT

Figure 4:
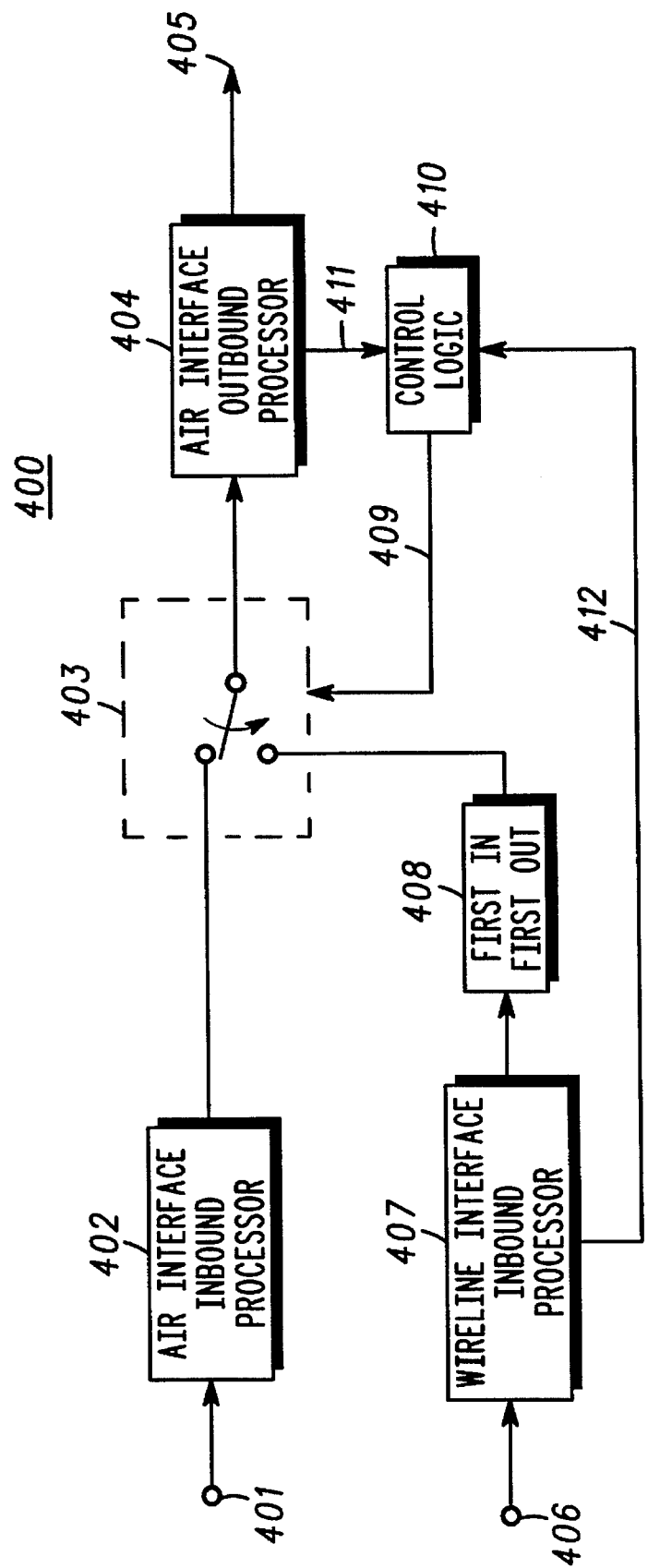
FIG. 4 illustrates, in block diagram form, the operation of a repeater station in accordance with the present invention.

The following paragraphs describe in detail a method devised by the inventors for substituting one message for another in a digital communication system in a fashion that avoids the shortcomings revealed in the foregoing discussion of the background art. The second, higher-priority message is stored until the first message can be terminated in an orderly manner at a transition point. In the preferred embodiment, the transition point is a frame boundary within the first message. If the second message is of a short enough duration, the first message may be resumed upon completion of the second message. If the first message is a higher priority than the second message, the system will continue to process the first message.

The communication system of FIG. 1 has been described above. The normal operating mode of such a system is further depicted in FIG. 2, generally depicted by the numeral 200. The inbound signal from a transmitting communication unit 201 consists of a frame synchronization pattern 202, which divides the inbound signal into multiple segments of generally equal duration, as well as one or more digitized voice segments 203, each encoding a segment of voice. The repeater station 103 detects the frame synchronization pattern 202, received by means of its air interface, and recovers the digitized voice segments 203 for transmission to the DIU 102 and console 101, and for retransmission 204 to other communication units 105, 106. The retransmitted frame synchronization pattern 205 and retransmitted voice segments 206 are time-delayed compared to the inbound signal 201, due to processing times in the repeater station 103.

System operation when a higher priority message from the console 101 and DIU 102 interrupt the retransmitted inbound message is shown in FIG. 3, generally depicted by numeral 300. Operation begins as described previously, with the inbound signal 201 being detected by the repeater station 103. The signal transmitted by the repeater station 301 initially consist of the frame synchronization pattern 302, and a plurality (n) of retransmitted voice segments or subframes 303 as received from the transmitting communication unit 104 over the repeater station's air interface. In one embodiment, for example, n equals six (6). This is the suitable transition point which contains six(6) voice subframes. Interruption by the higher priority message is initiated when the repeater station 103 receives a higher priority signal 309 from the console 101 and DIU 102 by means of its wireline interface. This input signal consists of an infrastructure control word 308, which contains control information instructing the repeater station how to process the signal, as well as multiple voice segments 305, 306, 307. As depicted in FIG. 3, the repeater station 103 begins receiving the wireline message 309 while it is retransmitting the over-the-air message initiated previously 201. The repeater station, therefore, waits until the end of that frame before switching to the wireline input. After the next frame synchronization pattern 304, the repeater station transmits the previously received wireline voice segments 305, 306, 307. In this way, the outbound signal from the repeater station 301 contains no disruptions in timing, in that the expected positions of the frame synchronization patterns 302 and 304 are unchanged from normal operation, and the higher priority console-sourced message is transmitted in its entirety without loss of the initial segments of voice signal 305, 306, 307.

Operation of the repeater station is shown in block diagram form in FIG. 4, generally depicted by the numeral 400. Over-the-air signals from a transmitting communication unit 104 are received at the air interface input port 401. The air interface inbound processor 402 detects and recovers these signals. See FIG. 5 for a flow diagram of the operation of the air interface inbound processor. In normal repeater operation, the output of the air interface inbound processor passes through the switch 403 to the air interface outbound processor 404 where it is prepared for transmission through the air interface output port 405. The wireline signal from the console and DIU is received at the wireline interface input port 406. When the wireline interface inbound processor 407, see FIG. 6 for a flow diagram of the operation of the wireline inbound processor, determines that a signal to be transmitted is present, it recovers that signal and passes it to the FIFO first-in/first-out memory 408 for storage. It also passes a wireline transmit indication 412 to the control logic 410. Upon reception of the wireline transmit indication 412, the control logic 410 waits until it receives a frame boundary indication 411 from the air interface outbound processor 404. Upon reception of the frame boundary indication 411, the control logic 410 changes the switch control signal 409 to the switch 403, causing the output of the FIFO memory 408 to be passed to the air interface outbound processor 404, where it is prepared for transmission through the air interface output port 405.

Figure 5:
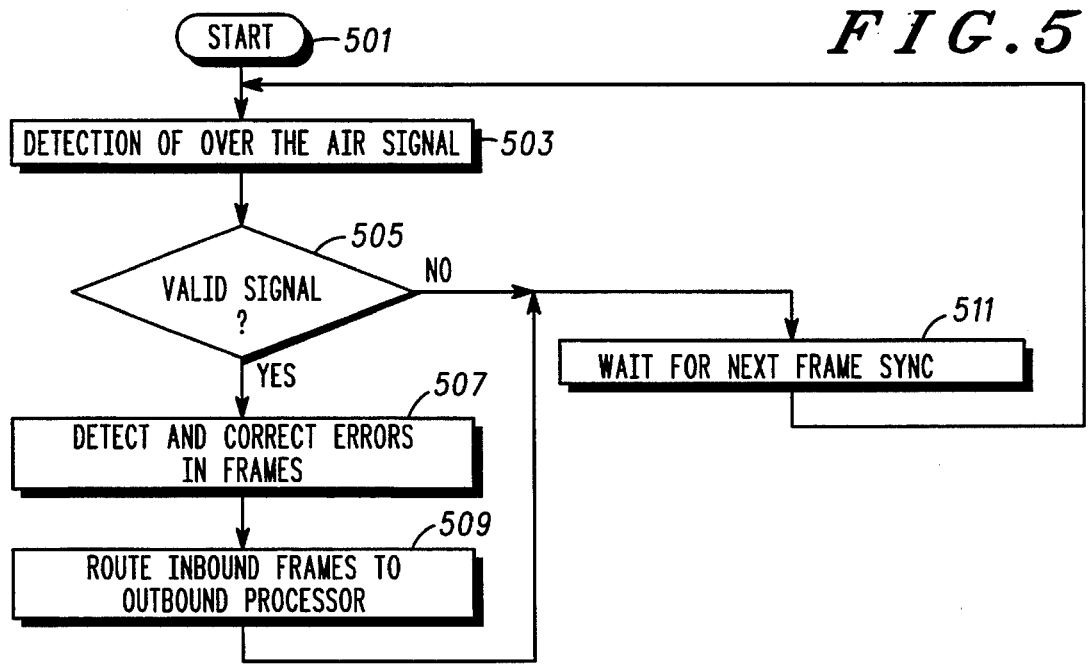
FIG. 5 illustrates a flow diagram of the operation of the air interface inbound processor 402 shown in FIG. 4.

Referring now to FIG. 5, there is a flow diagram of the operation or process of the air interface inbound processor 402 shown in FIG. 4.

The process starts, step 501, and then proceeds to detect the over-the-air signal, step 503.

The process then determines whether the signal is valid step 505. If the determination from this step 505 is positive, the process detects and corrects errors in frames step 507, and then routes inbound frames to the outbound processor, step 509. The process then waits for the next frame synchronization signal, step 511. The process then returns to step 503.

Otherwise, if the determination from step 505 is negative, the process then waits for the next frame synchronization signal, step 511, and then returns to step 503.

Figure 6:
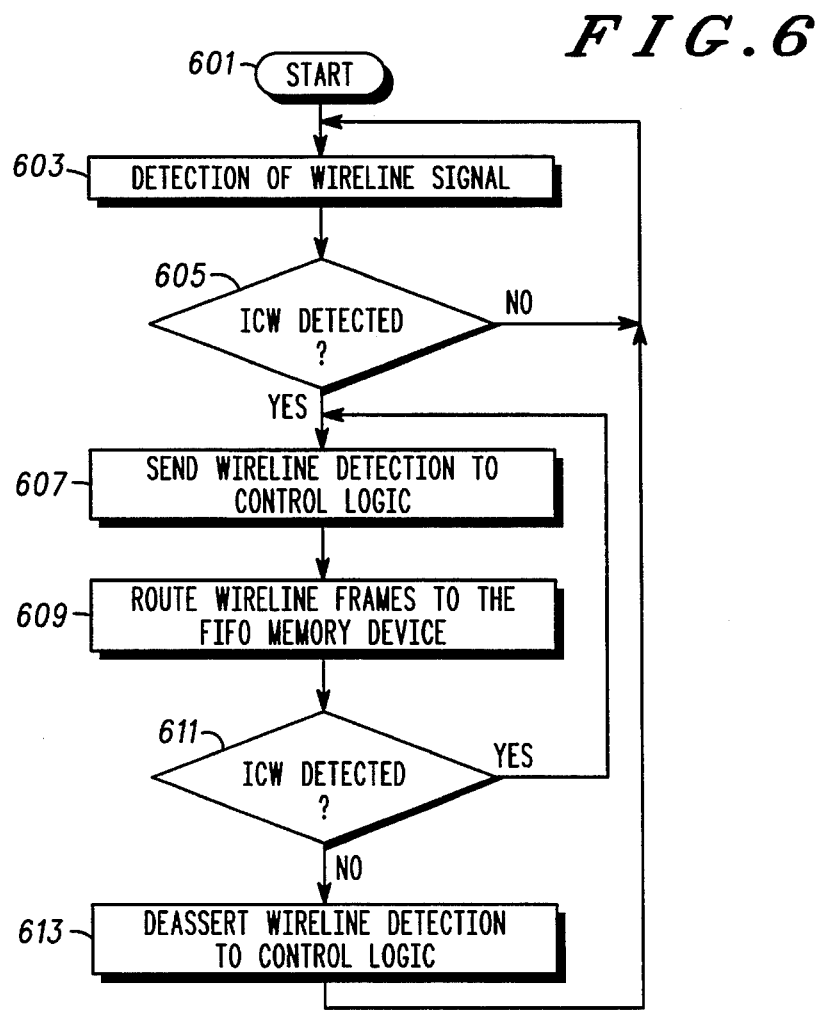
FIG. 6 illustrates a flow diagram of the operation of the wireline inbound processor 407 shown in FIG. 4.

FIG. 6 illustrates a flow diagram of the operation or process of the wireline inbound processor 407 shown in FIG. 4.

The process starts, step 601, and then proceeds to detect the wireline signal, step 603.

The process then determines whether an ICW has been detected step 605. If the determination from this step 605 is negative, the process returns to step 603.

Otherwise, if the determination from step 605 is positive, the process sends the wireline detection to the control logic 410, step 607. The process then routes wireline frames to the FIFO memory device 408, step 609.

The process then determines whether an ICW has been detected after 6 frames, step 611. If the determination from this step 611 is positive, the process returns to step 607.

Otherwise, if the determination from step 611 is negative, the process de-asserts the wireline detection to the control logic 410, step 613. The process then returns to step 603.

The method described above assigns higher priority to the signals sourced from the console, rather than to the signals sourced from the communications units. While this is typically the case in RF communications systems, the method described above is equally applicable to situations where the priorities are reversed.

Utilizing the method described, loss of the initial portion of the second, higher-priority message is avoided. This is of particular importance in the so-called "Shoot/Don't Shoot" scenario, where the first few words of a message transmission are of critical importance.

What is claimed is:

1. In a frame-synchronous digital communications system supporting message traffic that is divided into digital frames, such frames consisting of digital voice information and such frames being subdivided into a plurality (n) of voice subframes, a method of substituting a second message in place of a first message, the method comprising the steps of:

(a) during the transmission of the first message, the first message including a sixth voice subframe, detecting the origination of the second message, the second message including a first voice subframe, by means of either a framing indication if the second message is RF originated or by an explicit message origination command if the second message is wireline originated;

(b) identifying a digital frame boundary as a transition point within the first message, such transition point being at the termination of the sixth voice subframe of the first message;

(c) completing transmission of the current frame of the first message, including the sixth voice subframe of the first message; and, (d) after the transition point, substituting the second message for at least a portion of the first message, with the first voice subframe of the second message beginning immediately after the sixth voice subframe of the first message.

2. The method of claim 1, wherein the detecting step (a) includes a further step of storing the second message.

3. The method of claim 2, wherein the second message is stored until the transition point is identified.

4. The method of claim 1, wherein the second message is a higher priority message than the first message.

5. The method of claim 1, wherein the first message is a higher priority message than the second message.

6. The method of claim 1, wherein transmission of the first message is resumed after completion of transmission of the second message.

7. The method of claim 1, wherein n equals six.

8. The method of claim 7, wherein the detecting step (a) includes a further step of storing the second message.

9. The method of claim 8, wherein the second message is stored until the transition point is identified.

10. The method of claim 8, wherein the second message is a higher priority message than the first message.

11. The method of claim 7, wherein the first message is a higher priority message than the second message.

12. The method of claim 7, wherein transmission of the first message is resumed after completion of transmission of the second message.

\* \* \* \* \*